US008707438B1

(12) United States Patent
Hsu (10) Patent No.: US 8,707,438 B1
(45) Date of Patent: Apr. 22, 2014

(54) SYSTEM AND METHOD FOR PROVIDING STORAGE FOR ELECTRONIC RECORDS

(75) Inventor: Windsor W. Hsu, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 1040 days.

(21) Appl. No.: 12/248,297

(22) Filed: Oct. 9, 2008

(51) Int. Cl.
*G06F 21/00* (2013.01)
(52) U.S. Cl.
USPC ............... 726/25; 726/22; 713/189; 713/190; 713/191; 713/192; 713/193; 713/194
(58) Field of Classification Search
None
See application file for complete search history.

(56) References Cited

U.S. PATENT DOCUMENTS

| 5,931,947 | A  | * | 8/1999 | Burns et al. | 726/4 |
| 5,991,810 | A  | * | 11/1999 | Shapiro et al. | 709/229 |
| 2005/0097260 | A1 | * | 5/2005 | McGovern et al. | 711/100 |
| 2005/0289656 | A1 | * | 12/2005 | Yokoyama | 726/27 |

* cited by examiner

*Primary Examiner* — Ghazal Shehni
(74) *Attorney, Agent, or Firm* — Blakely Sokoloff Taylor & Zafman LLP (57) ABSTRACT

Techniques for providing storage for electronic records are described herein. According to one embodiment, a command is received from a client through an interface of a storage system. An approval is received from an authorization agent associated with the storage system for the received command. In response to the approval received from the authorization agent for the received command, an operation associated with the received command is performed. Other methods and apparatuses are also described.

28 Claims, 6 Drawing Sheets

SYSTEM AND METHOD FOR PROVIDING STORAGE FOR ELECTRONIC RECORDS

FIELD OF THE INVENTION

The present invention relates generally to data storage. More particularly, this invention relates to write-once-read-many (WORM) storage.

BACKGROUND

Electronic records can be modified relatively easily and without leaving much of a trace. As organizations increasingly rely on electronic records, it is important to protect these records from both accidental and intentional modification.

Several systems for storing electronic records have been introduced over the last few years. These include the EMC Centera, IBM Data Retention 550, and Network Appliance SnapLock. These systems allow records to be committed to be immutable (WORM) for some specified retention period or indefinitely. A record that has been committed to be immutable is protected by the systems from deletion or modification for the specified retention period or indefinitely. The systems typically maintain a clock against which the current time is compared to determine whether the specified retention period has expired.

These systems essentially offer two extremes in protecting records from deletion or modification. In the first extreme, the systems do not trust anybody, including the system administrator. Such systems ensure that the immutability protection, that is the protection of records from deletion or modification, cannot be overcome or circumvented by anybody, including the system administrator. This, however, creates difficulties in managing the system. For example, if an honest mistake is made in configuring the system or in committing records to be immutable, the mistake cannot be undone. Legitimate system management operations such as migrating the records or adjusting the clock used to determine whether the retention period has expired are also disallowed because they could be attempts to overcome the immutability protection.

In the second extreme, the systems trust the system administrator to not intentionally overcome the immutability protection. For example, the systems may allow the administrator to delete a volume that contains records committed to be immutable even if the records should still be protected from deletion or modification. The administrator may also be allowed to adjust the clock forward even though the adjustment could cause the premature expiration of records that should still be protected from deletion or modification. While this approach solves many of the difficulties in managing such systems, an honest mistake or a rogue administrator could cause the records to be compromised.

SUMMARY OF THE DESCRIPTION

Techniques for providing storage for electronic records are described herein. According to one embodiment, a command is received from a client through an interface of a storage system. An approval is received from an authorization agent associated with the storage system for the received command. In response to the approval received from the authorization agent for the received command, an operation associated with the received command is performed.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for providing storage for electronic records are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, a storage system is provided that requires concurrence of more than one party or user before the system will perform operations that could compromise the integrity of the stored data. For example, an operation to adjust forward the clock used for determining whether the retention period has expired could cause records to be prematurely expired and should therefore require concurrence of multiple parties. For example, when an administrator attempts to move an immutable record (e.g., to another folder, directory or volume), a third party other than the administrator (e.g., an official of an organization entity) is required to provide additional information to approve such an operation requested by the administrator before the operation is performed. As a result, additional safeguard is in place while providing flexibility to the storage system.

Note that the term electronic record as used herein refers to any data object (e.g. email, instant message, file, document, object, record, etc) that should be properly retained. In many cases, these records must not be modified or deleted for some specified retention period or indefinitely. Such records are also referred to as immutable data objects.

Figure 1A:
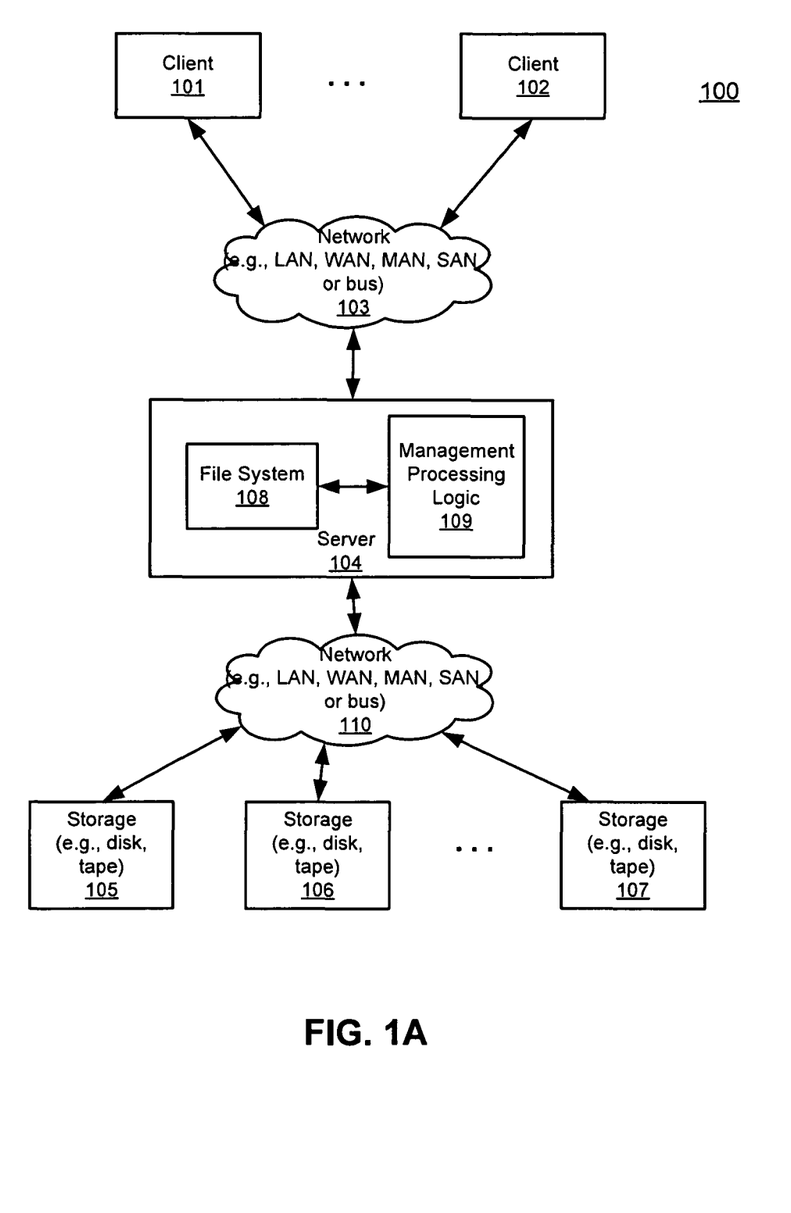
FIGS. 1A-1B are block diagrams illustrating a system configuration according to certain embodiments of the invention.

FIG. 1A is a block diagram illustrating a system configuration according to one embodiment of the invention. Referring to FIG. 1A, system configuration 100 includes, but is not limited to, one or more clients 101-102 communicatively coupled to a server 104 over a network 103 to access data stored in any of storage 105-107 over a network 110. Clients 101-102 may be any type of client such as a server, a personal computer, a "thin" client, a personal digital assistant (PDA), a Web enabled appliance, or a Web enabled cellular phone, etc. Server 104 may include any type of server or cluster of servers. For example, server 104 may be a storage server used for any of various different purposes, such as to provide multiple users with access to shared data and/or to back up mission critical data. Server 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Server 104 may have a distributed architecture, or all of its components may be integrated into a single unit.

Network 103 may be any type of network such as a local area network (LAN), a wide area network (WAN) such as Internet, a corporate intranet, a metropolitan area network (MAN), a storage area network (SAN), a bus, or a combination thereof. Likewise, network 110. Storage 105-107 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage 105-107 may also be combinations of such devices. In the case of disk storage media, the storage devices 105-107 may be organized into one or more volumes of Redundant Array of Inexpensive Disks (RAID). Server 104 and/or storage 105-107 may be implemented as part of an archive and/or backup system such as the deduplicating storage systems available from Data Domain, Inc. of Santa Clara, Calif.

According to one embodiment, server 104 includes a file system 108 and management processing logic 109 such as WORM or immutable object processing logic. File system 108 may be any kind of file system. A file system generally refers to a structuring of data and metadata on a storage device, such as disks, which permits reading/writing of data on those disks and/or the processing logic to enable such structuring. The metadata is organized in data structures such as inodes that are used to store information about a data object (a file in this example), while the data blocks are structures used to store the actual data for the file. The information contained in an inode may include, for example, ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file.

Management processing logic 109 may be implemented as part of file system 108 or a separate module communicatively coupled to the file system 108. According to one embodiment, in response to a request received, for example, via an interface of file system 108, processing logic 109 examines the request to determine whether the request could potentially compromise the integrity of a data object which has been previously committed to be immutable. Such an examination may be performed against a set of rules or policies previously configured. For example, if the request is to move an immutable object to a new location (e.g. folder, directory or volume) or to set forward (into the future) the clock used to determine whether the retention period of a data object has expired, processing logic 109 is configured to communicate with an authorization agent, which may be located locally or remotely over a network, for requesting an approval for such an operation. When such an approval, which may include a credential, is received from the authorization agent, processing logic 109 then allows the request to be carried out as usual. Otherwise, the request would be denied.

Figure 1B:
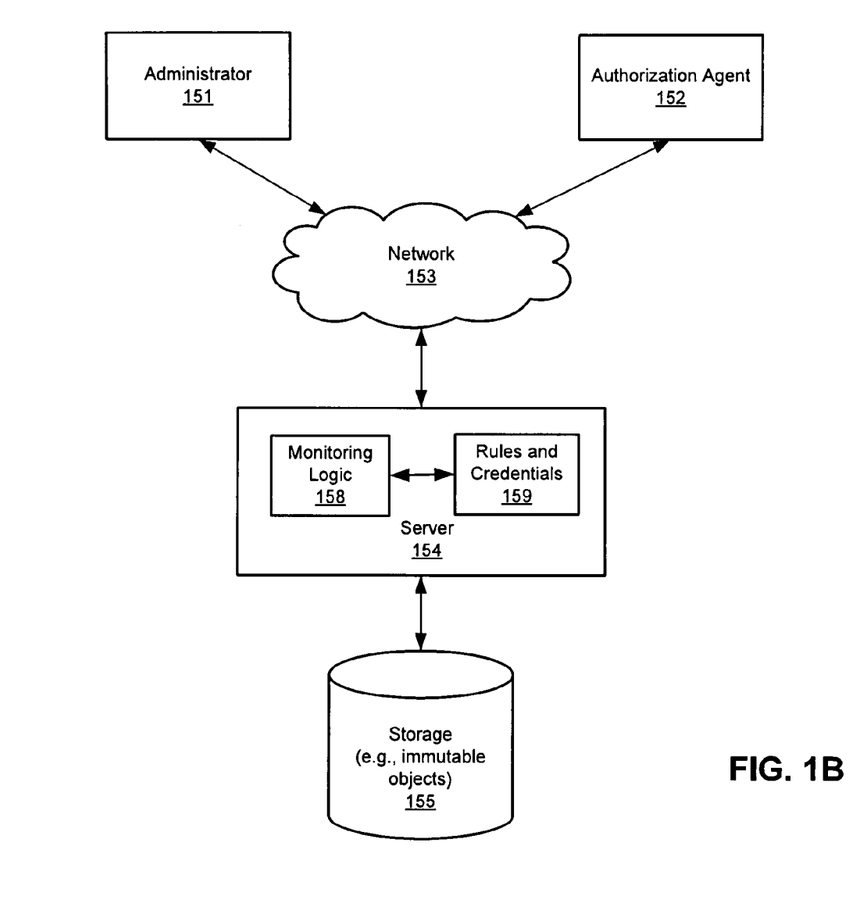

Note that any of clients 101-102 may be a user or an administrator requesting an operation that may compromise the integrity of an immutable object or alternatively, an authorization agent, as shown in FIG. 1B. Referring to FIG. 1B, according to one embodiment, in response to a request received from administrator 151, monitoring logic 158 of server 154 examines the request to determine whether the requested operation may compromise the integrity of a data object stored in storage 155. Such an examination may be performed against a set of rules or policies 159 previously configured. For example, if the requested operation is to set forward the clock used to determine whether the retention period of a data object has expired, monitoring logic 158 is configured to require that an approval is received from authorization agent 152 before the requested operation is performed.

In one embodiment, monitoring logic 158 is configured to communicate with authorization agent 152 for requesting an approval for the requested operation. When an approval is received, monitoring logic 158 compares the received approval against the necessary credentials 159 to determine whether the approval is valid. If the approval is valid, monitoring logic 158 then allows the request to be processed as usual. Otherwise, the request is denied. Note that some or all of components as shown in FIG. 1B may be implemented as software, hardware, or a combination of both.

Figure 2:
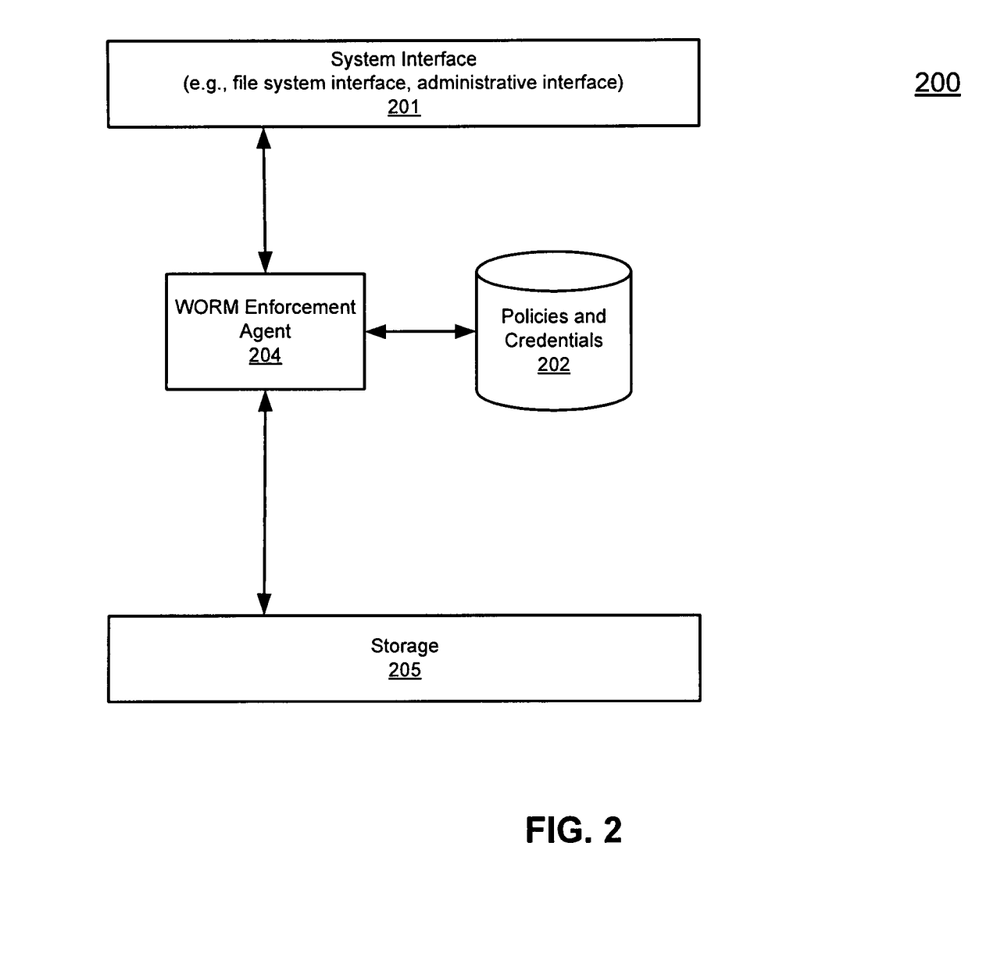
FIG. 2 is a block diagram illustrating a system for handling immutable data objects according to one embodiment of the invention.

FIG. 2 is a block diagram illustrating a system for managing data objects according to one embodiment of the invention. For example, system 200 may be implemented as part of management processing logic 109 and/or file system 108 of server 104 in FIG. 1A. Alternatively, system 200 may be implemented as part of the system as shown in FIG. 1B. Referring to FIG. 2, system 200 includes, but is not limited to, a WORM enforcement agent 204 coupled to a system interface 201 and storage 205. System interface 201 may be a part of file system interface that communicates with an application via various file system calls dependent upon an operating system associated with the file system. System interface 201 may also be a part of an administrative interface such as that for managing system 200. Storage 205 may be any kind of storage devices such as storage 105-107 of FIG. 1A or storage 155 of FIG. 1B. In addition, a database 202 is maintained for storing certain rules or policies to determine whether a particular command could potentially compromise the integrity of an immutable object. Database 202 may also store certain credential information that is used to verify whether a particular approval received is valid.

According to one embodiment, prior to receiving any request for an operation that could compromise the integrity of an immutable object, a set of credentials should be configured and stored in database 202. For example, if multiple officials of an organization entity are assigned to authorize requests that could compromise the integrity of an immutable object, individual credentials for each official should be configured and stored in database 202. The information stored in database 202 may further include communication information such as a particular way to communicate with an associated official (e.g., email address). Database 202 may further include information (e.g., rules or policies) identifying certain categories of commands that could potentially compromise the integrity of an immutable object.

According to one embodiment, in response to a request received from an administrator, WORM enforcement agent 204 intercepts the request and examines the request to determine whether an operation associated with the request may compromise the integrity of an immutable data object stored in storage 205. Such an examination may be performed against a set of rules or policies 202. If it is determined that the operation may compromise the integrity of an immutable data object stored in storage 205 (e.g. if the request is for moving an immutable object to a different location), WORM enforcement agent 204 is configured to require an approval to be received from an authorization agent before performing the operation. When such an approval is received from authorization agent, the WORM enforcement agent verifies the received approval against the information stored in database 202 to determine whether the received approval is valid. If the approval is verified, WORM enforcement agent 204 allows the requested operation to be processed as usual. Otherwise, the request is denied. Again, some or all of components as shown in FIG. 2 may be implemented as software, hardware, or a combination of both.

In one embodiment, WORM enforcement agent 204 is configured to communicate with an authorization agent via a communications interface for requesting an approval for such an operation. In one embodiment, WORM enforcement agent 204 communicates with an authorization agent via email. In one embodiment, WORM enforcement agent 204 verifies whether the received approval is valid by checking that a credential associated with the received approval is included in a set of acceptable credentials stored in database 202.

Given an organization entity such as for example a company, a government agency, a trust, etc, there is typically one or more system administrators employed to maintain and operate the system as shown in FIG. 2. The duties of a system administrator are wide-ranging, and vary widely from one organization to another. They are usually responsible for installing, supporting, maintaining servers or other computer systems, and planning for and responding to service outages and other problems.

An authorization agent as used in this application refers to any entity tasked with providing oversight on the actions of a system administrator, particularly from a data integrity and security perspective. This entity could be another administrator or a supervisor but more commonly is an information security officer who is responsible for managing information security within the organization. In some organizations, this entity could be a compliance officer who is responsible for ensuring that the organization complies with certain regulations including those that specify how records should be managed. This entity could also be a third party such as one that provides auditing and/or consulting services.

In one embodiment, a credential is associated with an authorization agent and stored in database 202. The credential may include one or more of a user ID, password, passphrase, etc. The credential may also include a public key certificate. In one embodiment, the credential includes a representation of a fingerprint, voiceprint, retinal scan, or other secure means of establishing identity. In one embodiment, the credential includes an email address, and an email is sent to the email address when a request that could impact the integrity of the data stored in the system is received. In one embodiment, the email sent includes details of the operation including who requested the operation.

Typically, the credential of an authorization agent must be configured before the system accepts data for storage. Multiple authorization agents may be configured and verifying that a received approval is valid includes checking that a credential associated with the received approval is associated with one of the multiple authorization agents configured. In one embodiment, approvals from multiple authorization agents are required before the requested operation is performed.

In one embodiment, an authorization agent is associated with a subset of a storage system (e.g. volume, directory, pool, collection, file, group of files, files of certain type, files with certain filename extension, etc.) and different subsets of the system may have different authorization agents associated with it, or none at all. When the system receives a request that could impact the integrity of the data stored, the system determines which subset of the system is affected and requires that an approval for the request be received from an authorization agent associated with the affected subset of the system before performing the request.

In one embodiment, when the system receives a request that could impact the integrity of the data stored, the system prompts for a credential to be input. The request is considered to be approved when a credential associated with a configured authorization agent is input. The system may keep track of a number of times the incorrect credential is entered and limit system access by the administrator submitting the request when the number of times that the wrong credential is entered exceeds a predetermined threshold.

In one embodiment, the system 200 accepts data objects to be stored and allows data objects to be committed to be immutable for a specified retention period or indefinitely. During the specified retention period or indefinitely, the system 200 prevents the data objects from being modified or deleted. In one embodiment, a default retention period is associated with the data object when it is committed to be immutable. In one embodiment, the system allows the retention period of an immutable data object to be extended by setting a time attribute such as "atime" into the future. Detailed information regarding this technique can be found in a co-pending U.S. patent application Ser. No. 11/839,453, entitled "System and Method for Providing Write-Once-Read-Many (WORM) Storage," filed Aug. 15, 2007, which is incorporated by reference herein in its entirety.

In one embodiment, the system prompts for an authorization agent to be configured during initial setup of the system. Subsequently, when an administrator attempts to perform an operation that could circumvent or compromise the immutability protection, the system prompts for approval of the configured authorization agent. The system performs the attempted operation only when it receives approval of the configured authorization agent. In one embodiment, a credential associated with the authorization agent is configured during initial setup of the system. Subsequently, approval for an operation is provided to the system by entering the credential associated with the authorization agent.

Examples of operations that could circumvent the immutability protection and thereby compromise the integrity of immutable objects include setting the clock used for determining whether the retention period for a data object has expired, moving an immutable object to a new location (e.g. folder, directory or volume), reducing the retention period of an immutable object, deleting an immutable object before its retention period has expired, converting an immutable object to a mutable object, and changing the configuration of authorization agent(s) associated with the system.

In one embodiment, approval of the authorization agent is needed only when the clock is adjusted into the future by an amount larger than a preset threshold. Other adjustments are permitted without the approval of the authorization agent. In one embodiment, the system supports using an automated mechanism, for example, the network time protocol (NTP), to make small adjustments to the clock to keep it in sync with another clock.

In one embodiment, the system allows the immutability protection set on a data object to be reset or revoked provided that the authorization agent concurs. Specifically, for example, an administrator may request that a data object currently committed to be immutable be converted to be a mutable object so that the object may be modified or deleted. When such a request is received, the system prompts for a credential to be entered and only performs the requested operation when the entered credential matches the credential of a configured authorization agent.

In one embodiment, the system allows the deletion of a subset of the system (e.g., volume, directory, pool) that contains objects committed to be immutable provided that the authorization agent concurs.

In one embodiment, the system records the received request and information about the authorization agent who approved the request in a journal or log, which may be stored in a database as well. In one embodiment, the system distributes the received request and information about the authorization agent who approved the request via email to the configured authorization agent(s).

Figure 3:
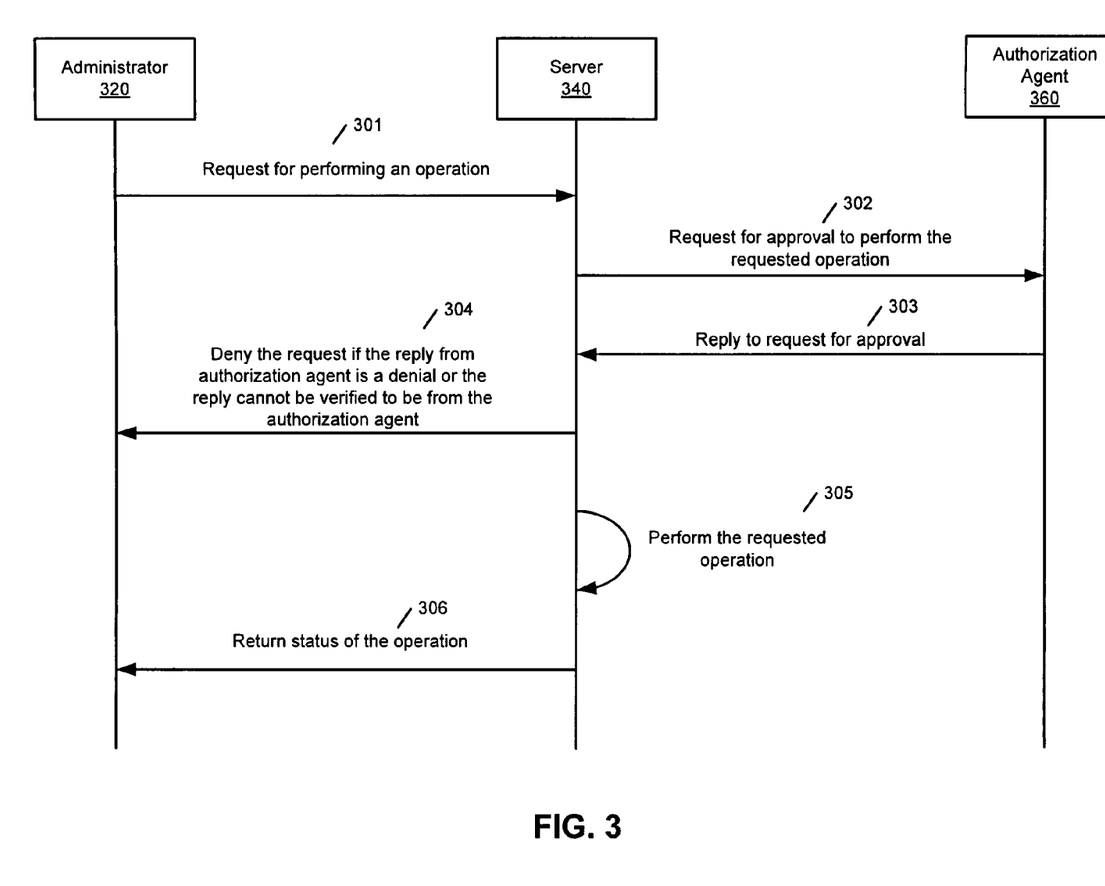
FIG. 3 is a flow diagram illustrating a process for managing immutable data objects according to one embodiment of the invention.

FIG. 3 is a flow diagram illustrating a process of managing immutable objects according to one embodiment of the invention. Note that the process as shown in FIG. 3 may be performed by processing logic which may include software, hardware, or a combination thereof. For example, the process may be performed by system 200 of FIG. 2. Referring to FIG. 3, during transaction 301, server 340 receives a request from administrator 320 for performing an operation. Server 340 then determines whether the requested operation may compromise the integrity of an immutable data object, for example, based on one or more rules or policies maintained by server 340. If so, via transaction 302, server 340 sends a request to an authorization agent 360, which may be located remotely or locally, for an approval. The request sent to authorization agent 360 may include certain identification information of administrator 320, as well as details of the requested operation.

Based on this information, authorization agent 360 determines whether the requested operation can be carried out, which may also be based on one or more rules or policies associated with an associated organization entity. If it is determined that the requested operation is appropriate, via transaction 303, authorization agent 360 returns the necessary approval to server 340 or alternatively, authorization agent 360 may return a denial to server 340 if it is determined that the requested operation is inappropriate. If the reply received by server 340 from authorization agent 360 is a denial, server 340 denies the request from administrator 320 via transaction 304.

The reply received from authorization agent 360 may include an identification of the requested operation and/or credential of authorization agent 360. Based on the reply received from authorization agent 360, server 340 examines the received credential against the credential of configured authorization agent(s) to verify whether the received credential is valid. If the received credential is not valid, server 340 may deny the request via transaction 304. Otherwise, server 340 performs the operation requested by the administrator 320, and status is returned via transaction 306. Other operations may also be performed.

Figure 4:
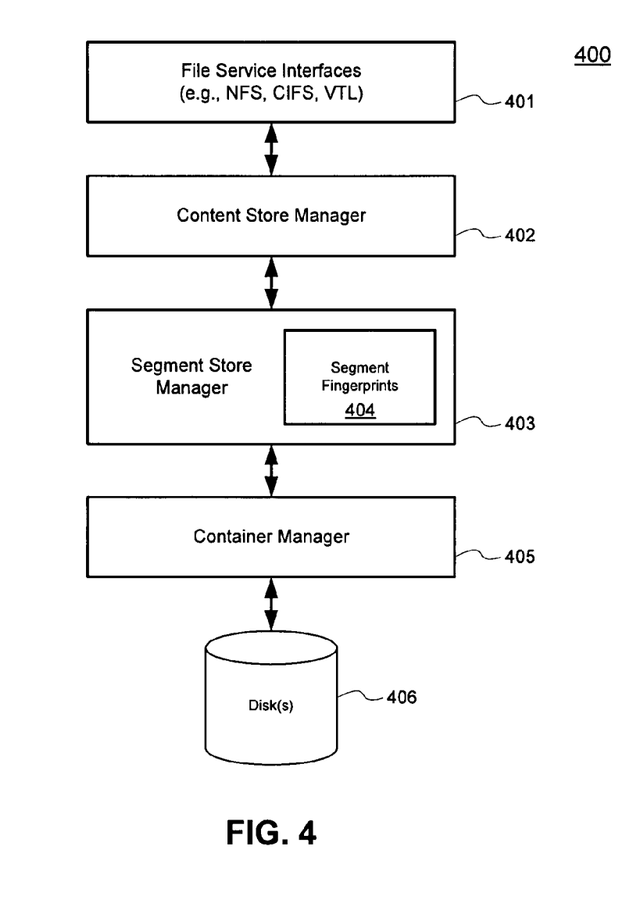
FIG. 4 is a block diagram illustrating an example of a storage system which may be used with an embodiment of the invention.

According to certain embodiments, the techniques described above can be used in a deduplicating data storage system such as those available from Data Domain, Inc. of Santa Clara, Calif. FIG. 4 is a block diagram illustrating an example of a data storage system which may be used with an embodiment of the invention. For example, system 400 may be implemented as part of systems as shown in FIGS. 1A-1B and 2. In this example, system 400 is a deduplicating data storage system. Referring to FIG. 4, system 400 includes, but it is not limited to, file service interface 401, content store manager 402, segment store manager 403 having segment fingerprints 404, and container manager for managing segments stored in containers in disk or disks 406.

According to one embodiment, system 400 breaks a data object (e.g., a file) into variable-length segments in a content dependent manner and computes a fingerprint for each segment. System 400 uses the fingerprints both to identify duplicate segments and as part of a segment descriptor used to reference a segment. It represents files as sequences of segment fingerprints. During writes, system 400 identifies duplicate segments and does its best to store only one copy of any particular segment. Before storing a new segment, system 400 may use a variation of the Ziv-Lempel algorithm to compress the segment.

In one embodiment, system 400 supports multiple access protocols which are layered on a common file services interface 401. Supported protocols include a network file system (NFS), a common Internet file system (CIFS), and a virtual tape library interface (VTL), etc. System 400 includes an administrative interface for managing the system. The administrative interface may be a part of file services interface 401.

When a data stream enters the system, it goes through one of the standard interfaces to the generic file services layer, which manages the name space and file metadata. The file services layer forwards write requests to content store 402 which manages the data content within a file. Content store 402 breaks a data stream into segments, uses segment store 403 to perform deduplication, and keeps track of the references for a file (e.g., mapping between logical data objects and physical data objects). Segment store 403 does the actual work of deduplication. It packs deduplicated (unique) segments into relatively large units, compresses such units using a variation of Ziv-Lempel algorithm to further compress the data, and then writes the compressed results into containers supported by container manager 405.

To read a data stream from the system, a client drives the read operation through one of the standard interfaces and the file services layer 401. Content store 402 uses the references to deduplicated segments to deliver the desired data stream to the client. Segment store prefetches, decompresses, reads and caches data segments from container manager 405.

According to one embodiment, content store 402 implements byte-range writes and reads for deduplicated data objects, where an object is a linear sequence of client data bytes and has intrinsic and client-settable attributes or metadata. An object may be a conventional file, a backup image of an entire volume or a tape cartridge.

To write a range of bytes into an object, content store 402 performs several operations. First, anchoring partitions the byte range into variable-length segments in a content dependent manner. Then segment fingerprinting computes a hash such as the SHA-1 hash and generates the segment descriptor based on it. Each segment descriptor contains per segment information of at least fingerprint and size. Further, segment mapping builds the tree of segments that records the mapping between object byte ranges and segment descriptors. The goal is to represent a data object using references to deduplicated segments.

To read a range of bytes in an object, content store 402 traverses the tree of segments created by the segment mapping operation above to obtain the segment descriptors for the relevant segments. It fetches the segments from Segment Store and returns the requested byte range to the client.

Segment store 403 is essentially a database of segments keyed by their segment descriptors 404. To support writes, it accepts segments with their segment descriptors and stores them. To support reads, it fetches segments designated by their segment descriptors. To write a data segment, segment store performs several operations. First, segment filtering determines if a segment is a duplicate. This is the key operation to deduplicate segments and may trigger disk I/Os, thus its overhead can significantly impact throughput performance. Further, container packing adds segments to be stored to a container which is the unit of storage in the system. The packing operation also compresses segment data using a variation of the Ziv-Lempel algorithm. A container, when fully packed, is appended to the Container Manager. Finally, segment indexing updates the segment index that maps segment descriptors to the container holding the segment, after the container has been appended to the container manager 405.

To read a data segment, segment store 403 performs certain operations. First, segment lookup finds the container storing the requested segment. This operation may trigger disk I/Os to look in the on-disk index, thus it is throughput sensitive. Container retrieval reads the relevant portion of the indicated container by invoking the container manager 405. Container unpacking decompresses the retrieved portion of the container and returns the requested data segment.

The container manager 405 provides a storage container log abstraction, not a block abstraction, to segment store 403. A container includes a metadata section having the segment descriptors for the stored segments. They are immutable in that new containers can be appended and old containers deleted, but containers cannot be modified once written. When segment store 403 appends a container, the container manager 405 returns a container ID which is unique over the life of the system.

The container manager 405 is responsible for allocating, deallocating, reading, writing and reliably storing containers. It supports reads of the metadata section or a portion of the data section, but it only supports appends of whole containers. If a container is not full but needs to be written to disk, it is padded out to its full size.

Container manager 405 is built on top of standard block storage 406. Advanced techniques such as software RAID-6, continuous data scrubbing, container verification, and end to end data checks are applied to ensure a high level of data integrity and reliability.

The container abstraction offers several benefits: 1) the fixed container size makes container allocation and deallocation easy; 2) the large granularity of a container write achieves high disk throughput utilization; and 3) a properly sized container size allows efficient full-stripe RAID writes, which enables an efficient software RAID implementation at the storage layer.

According to one embodiment, certain components of system 400, such as file service interface, include a logic configured to examine whether a particular request received could possibly compromise the integrity of an immutable data object and to request the necessary approval from an authorization agent for such a request, using the techniques set forth above. Other configurations may exist.

Figure 5:
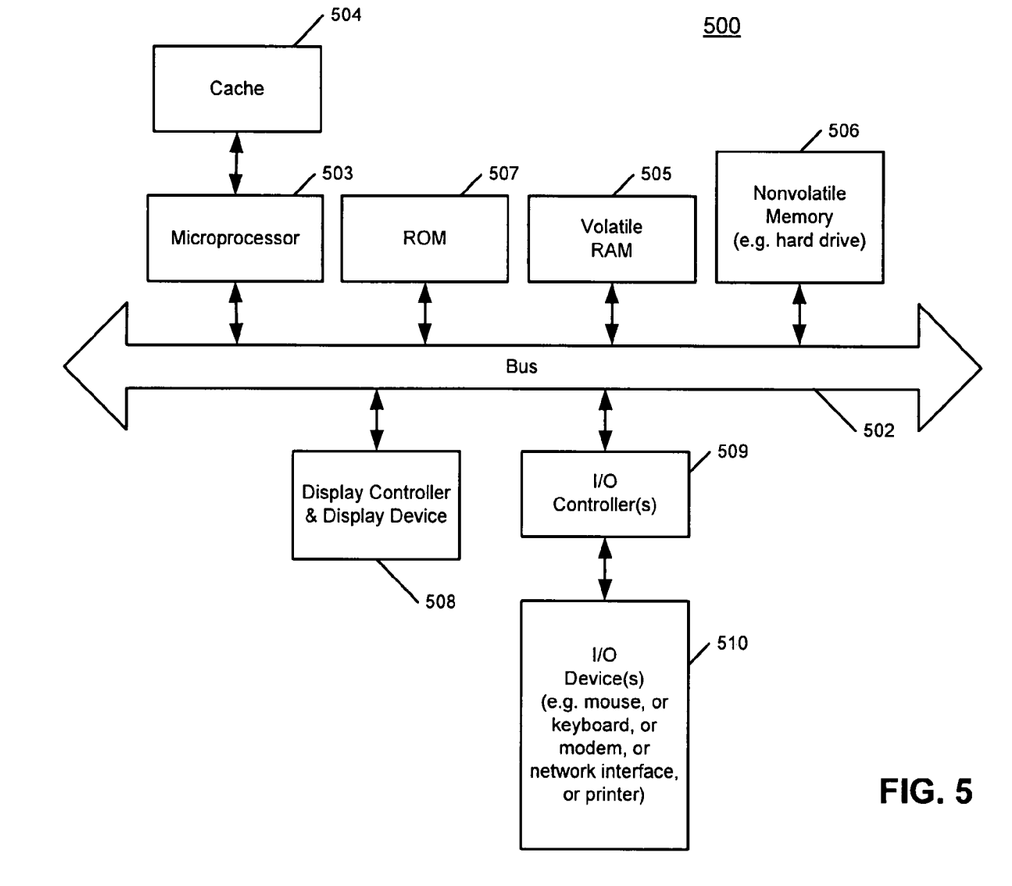
FIG. 5 is a block diagram of a data processing system which may be used with one embodiment of the invention.

FIG. 5 is a block diagram of a data processing system which may be used with one embodiment of the invention. For example, the system 500 shown in FIG. 5 may be used as a client computer system such as any client, administrator, authorization agent, and/or server as shown in FIGS. 1A-1B and 2-3 described above.

Note that while FIG. 5 illustrates various components of a computer system, it is not intended to represent any particular architecture or manner of interconnecting the components; as such details are not germane to the present invention. It will also be appreciated that network computers, handheld computers, cell phones, and other data processing systems which have fewer components or perhaps more components may also be used with the present invention. The computer system of FIG. 5 may, for example, be an Apple Macintosh computer or an IBM compatible PC.

As shown in FIG. 5, the computer system 500, which is in a form of a data processing system, includes a bus or interconnect 502 coupled to a processor 503 and a ROM 507, a volatile RAM 505, and a non-volatile memory 506. Processor 503 may include multiple processors and/or core logics that constitute central processing units (CPUs) of the system and thus, control the overall operations of the system. According to certain embodiments, processor 503 accomplish this by executing software stored in any of the memories 505-507, such as, for example, applications and operating system, etc. Processor 503 may include, one or more programmable general-purpose or special-purpose microprocessors, digital signal processors (DSPs), programmable controllers, application specific integrated circuits (ASICs), programmable logic devices (PLDs), or the like, or a combination of such devices.

The processor 503, which may be, for example, an Intel processor or a PowerPC processor, is coupled to cache memory 504 as shown in the example of FIG. 5. The bus 502 interconnects these various components together and also interconnects these components 503 and 505-507 to a display controller and display device 508, as well as to input/output (I/O) devices 510, which may be mice, keyboards, modems, network interfaces, printers, and other devices which are well-known in the art.

Typically, the input/output devices 510 are coupled to the system through input/output controllers 509. The volatile RAM 505 is typically implemented as dynamic RAM (DRAM) which requires power continuously in order to refresh or maintain the data in the memory. The non-volatile memory 506 is typically a magnetic hard drive, a magnetic optical drive, an optical drive, a DVD RAM, a Flash memory, or other type of memory system which maintains data even after power is removed from the system. Typically, the non-volatile memory will also be a random access memory, although this is not required.

While FIG. 5 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 502 may include one or more buses connected to each other through various bridges, controllers, and/or adapters, as is well-known in the art. In one embodiment, the I/O controller 509 includes a USB (Universal Serial Bus) adapter for controlling USB peripherals. Alternatively, I/O controller 509 may include an IEEE-1394 adapter, also known as FireWire adapter, for controlling FireWire devices. Other components may also be included.

Thus, techniques for providing storage for electronic records have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, floppy disks, optical disks, CD-ROMs, DVDs, magnetic-optical disks, read-only memories (ROMs), random access memories (RAMs), flash memories, erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing data objects, comprising:
   receiving a command from a client through an interface of a storage system for accessing data stored in the storage system;
   in response to the command, examining the command to determine whether the command could potentially compromise integrity of an immutable data object stored in the storage system;
   in response to determining that the command could potentially compromise integrity of the immutable data object, transmitting a request to an authorization agent over a network for an approval of processing the command to access the data stored in the storage system, wherein the authorization agent is a remote entity separated from the client and the storage system over the network;
   receiving the approval from the authorization agent associated with the storage system for the received command over the network;
   extracting a first credential from the approval received from the authorization agent;
   comparing the first credential with a second credential that is associated with the authorization agent, wherein the second credential is selected from a set of credentials previously configured and stored in a database; and
   in response to the comparison that the first and second credentials are matched, performing an operation associated with the received command in response to the approval received from the authorization agent for the received command.

2. The method of claim 1,
   wherein the request for approval is sent to the authorization agent only if the received command could potentially compromise integrity of the immutable data object.

3. The method of claim 2, further comprising configuring a set of one or more rules used to identify a list of command candidates, which when carried out, could potentially compromise integrity of the immutable data object, wherein the command received from the client is compared against the list of command candidates to determine whether the received command could potentially compromise integrity of the immutable data object.

4. The method of claim 3, further comprising maintaining the set of credentials associated with the authorization agent, wherein for each of the command candidates to be carried out, at least one of the set of credentials has to be received as part of the approval.

5. The method of claim 4,
   wherein the operation associated with the received command is carried out only when the first and second credentials are matched.

6. The method of claim 2, wherein the immutable data object is a write-once-read-many (WORM) data object.

7. The method of claim 2, wherein the command received from the client is to adjust a clock used to determine whether a retention period associated with the immutable data object during which the data object is protected from being modified has expired.

8. The method of claim 2, wherein the command received from the client is to revoke an immutable state of the immutable data object such that the data object becomes modifiable.

9. The method of claim 2, wherein the command received from the client is to move the immutable data object to a new storage location.

10. The method of claim 2, wherein the command received from the client, when carried out, could cause the immutable data object to be deleted.

11. The method of claim 1, wherein the data stored in the storage system comprises a first subset of data and a second subset of data, wherein accessing the first subset of data requires a first approval from a first authorization agent and accessing the second subset of data requires a second approval from a second authorization agent that is different than the first authorization agent.

12. A non-transitory machine-readable storage medium having instructions stored therein, which when executed by a processor, cause the processor to perform operations for managing data objects, the operations comprising:
receiving a command from a client through an interface of a storage system for accessing data stored in the storage system;
in response to the command, examining the command to determine whether the command could potentially compromise integrity of an immutable data object stored in the storage system;
in response to determining that the command could potentially compromise integrity of the immutable data object, transmitting a request to an authorization agent over a network for an approval of processing the command to access the data stored in the storage system, wherein the authorization agent is a remote entity separated from the client and the storage system over the network;
receiving the approval from the authorization agent associated with the storage system for the received command over the network;
extracting a first credential from the approval received from the authorization agent;
comparing the first credential with a second credential that is associated with the authorization agent, wherein the second credential is selected from a set of credentials previously configured and stored in a database; and
performing an operation associated with the received command in response to the approval received from the authorization agent for the received command.

13. The non-transitory machine-readable storage medium of claim 12,
wherein the request for approval is sent to the authorization agent only if the received command could potentially compromise integrity of the immutable data object.

14. The non-transitory machine-readable storage medium of claim 13, wherein the operations further comprise configuring a set of one or more rules used to identify a list of command candidates, which when carried out, could potentially compromise integrity of the immutable data object, wherein the command received from the client is compared against the list of command candidates to determine whether the received command could potentially compromise integrity of the immutable data object.

15. The non-transitory machine-readable storage medium of claim 14, wherein the operations further comprise maintaining set of credentials associated with the authorization agent, wherein for each of the command candidates to be carried out, at least one of the set of credentials has to be received as part of the approval.

16. The non-transitory machine-readable storage medium of claim 15,
wherein the operation associated with the received command is carried out only when the first and second credentials are matched.

17. The non-transitory machine-readable storage medium of claim 13, wherein the immutable data object is a write-once-read-many (WORM) data object.

18. The non-transitory machine-readable storage medium of claim 13, wherein the command received from the client is to adjust a clock used to determine whether a retention period associated with the immutable data object during which the data object is protected from being modified has expired.

19. The non-transitory machine-readable storage medium of claim 13, wherein the command received from the client is to revoke an immutable state of the immutable data object such that the data object becomes modifiable.

20. The non-transitory machine-readable storage medium of claim 13, wherein the command received from the client is to move the immutable data object to a new storage location.

21. The non-transitory machine-readable storage medium of claim 13, wherein the command received from the client, when carried out, could cause the immutable data object to be deleted.

22. The non-transitory machine-readable storage medium of claim 12, wherein the data stored in the storage system comprises a first subset of data and a second subset of data, wherein accessing the first subset of data requires a first approval from a first authorization agent and accessing the second subset of data requires a second approval from a second authorization agent that is different than the first authorization agent.

23. An apparatus for managing data objects, comprising:
a hardware processor;
a first interface, executed by the hardware processor, to receive a command from a client of a storage system for accessing data stored in the storage system;
an enforcement agent executed by the hardware processor, in response to the command, to examine the command to determine whether the command could potentially compromise integrity of an immutable data object stored in the storage system;
a second interface, executed by the hardware processor, in response to determining that the command could potentially compromise integrity of the immutable data object, to transmit a request to an authorization agent over a network for an approval of processing the command to access the data stored in the storage system and to receive the approval from the authorization agent associated with the storage system for the received command over the network, wherein the authorization agent is a remote entity separated from the client and the storage system over the network, wherein the enforcement agent is to extract a first credential from the approval received from the authorization agent, and to compare the first credential with a second credential that is associated with the authorization agent, wherein the second credential is selected from a set of credentials previously configured and stored in a database; and
a command processing logic, in response to the comparison that the first and second credentials are matched, to perform an operation associated with the received command in response to the approval received from the authorization agent for the received command.

24. The apparatus of claim 23, further comprising:
an interface to receive a data object to be stored as an immutable data object in the storage system; and
a WORM processing logic to store the data object as the immutable data object in the storage system,
wherein the request for approval is sent to the authorization agent only if the received command could potentially compromise integrity of the immutable data object.

25. The apparatus of claim 24, further comprising a database to store a set of one or more rules configured to identify a list of command candidates, which when carried out, could potentially compromise integrity of immutable data object, wherein the command received from the client is compared against the list of command candidates to determine whether the received command could potentially compromise integrity of the immutable data object.

26. The apparatus of claim 25, wherein the database is configured to store the set of credentials associated with the authorization agent, wherein for each of the command candidates to be carried out, at least one of the set of credentials has to be received as part of the approval.

27. The apparatus of claim 26,
wherein the operation associated with the received command is carried out only when the first and second credentials are matched.

28. The apparatus of claim 24, wherein the immutable data object is a WORM data object.

* * * * *